United States Patent [19]
Kondo et al.

[11] Patent Number: 5,321,513
[45] Date of Patent: Jun. 14, 1994

[54] APPARATUS FOR SHIFTING THE DC LEVEL OF A LUMINANCE SIGNAL BASED ON FREQUENCY DISTRIBUTION AND RATE OF MODULATION

[75] Inventors: Toshiharu Kondo; Takashi Kohashi, both of Kanagawa; Fumiaki Kato, Chiba, all of Japan

[73] Assignee: Sony Corporation, Tokyo, Japan

[21] Appl. No.: 36,164

[22] Filed: Mar. 24, 1993

[30] Foreign Application Priority Data

Apr. 6, 1992 [JP] Japan .................................. 4-114108

[51] Int. Cl.$^5$ .............................................. H04N 5/16
[52] U.S. Cl. .................................... 348/691; 348/674
[58] Field of Search ............... 358/164, 166, 171, 174, 358/168, 169, 32, 34, 37, 39; H04N 5/16

[56] References Cited

U.S. PATENT DOCUMENTS 4,751,577  6/1988  Kawai .................................. 358/174
4,799,106  1/1989  Moore .................................. 358/164

Primary Examiner—James J. Groody
Assistant Examiner—Sherrie Hsia
Attorney, Agent, or Firm—Lewis H. Eslinger; Jay H. Maioli

[57] ABSTRACT

A video signal processing circuit includes a level shifter for shifting the dc level of an input luminance signal; a gain adjuster for increasing the gain for the luminance signal when the luminance signal has a low luminance level and for decreasing the gain for the luminance signal when the luminance signal has a high luminance level; and a shifting amount setting unit for setting the amount for shifting the dc level on the basis of the frequency distribution of the luminance signal and the rate of modulation of the luminance signal.

6 Claims, 5 Drawing Sheets

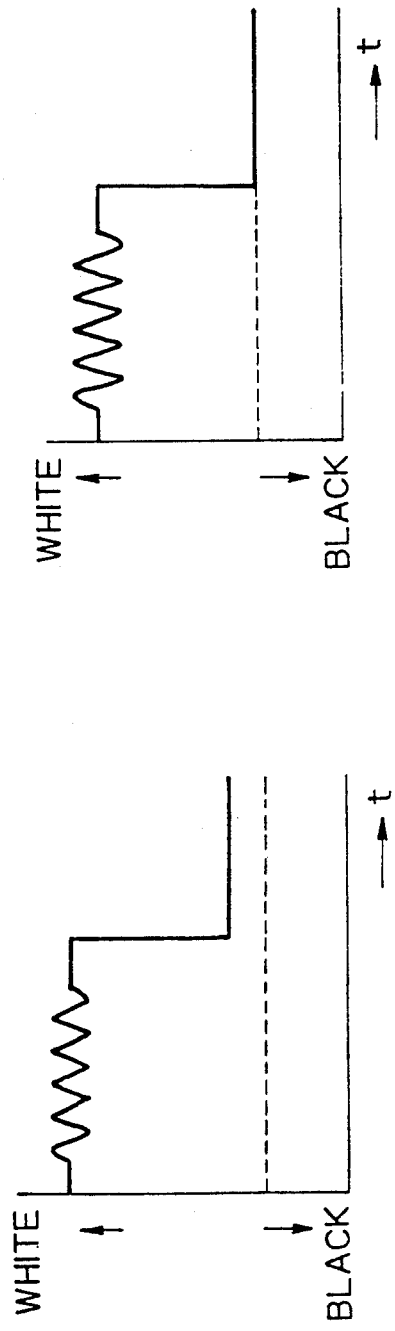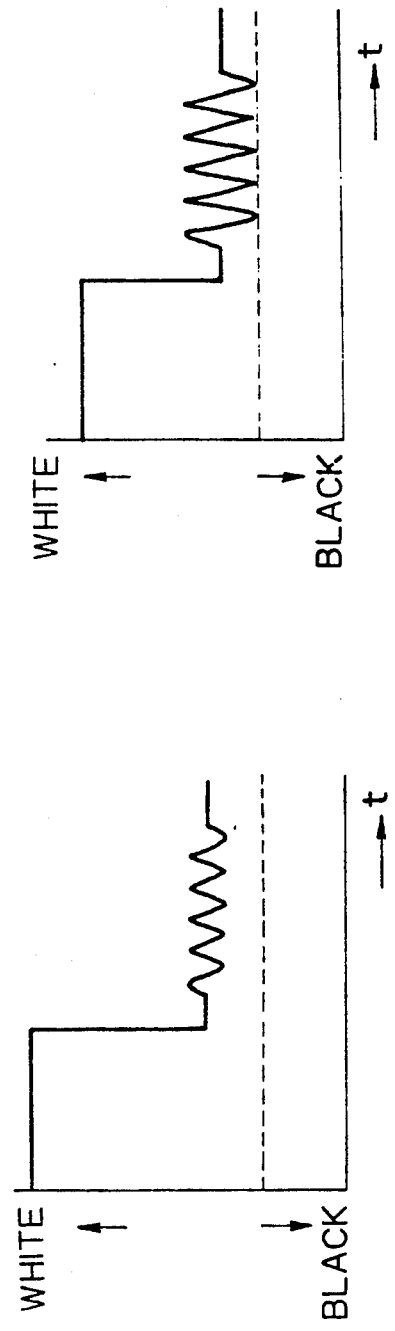

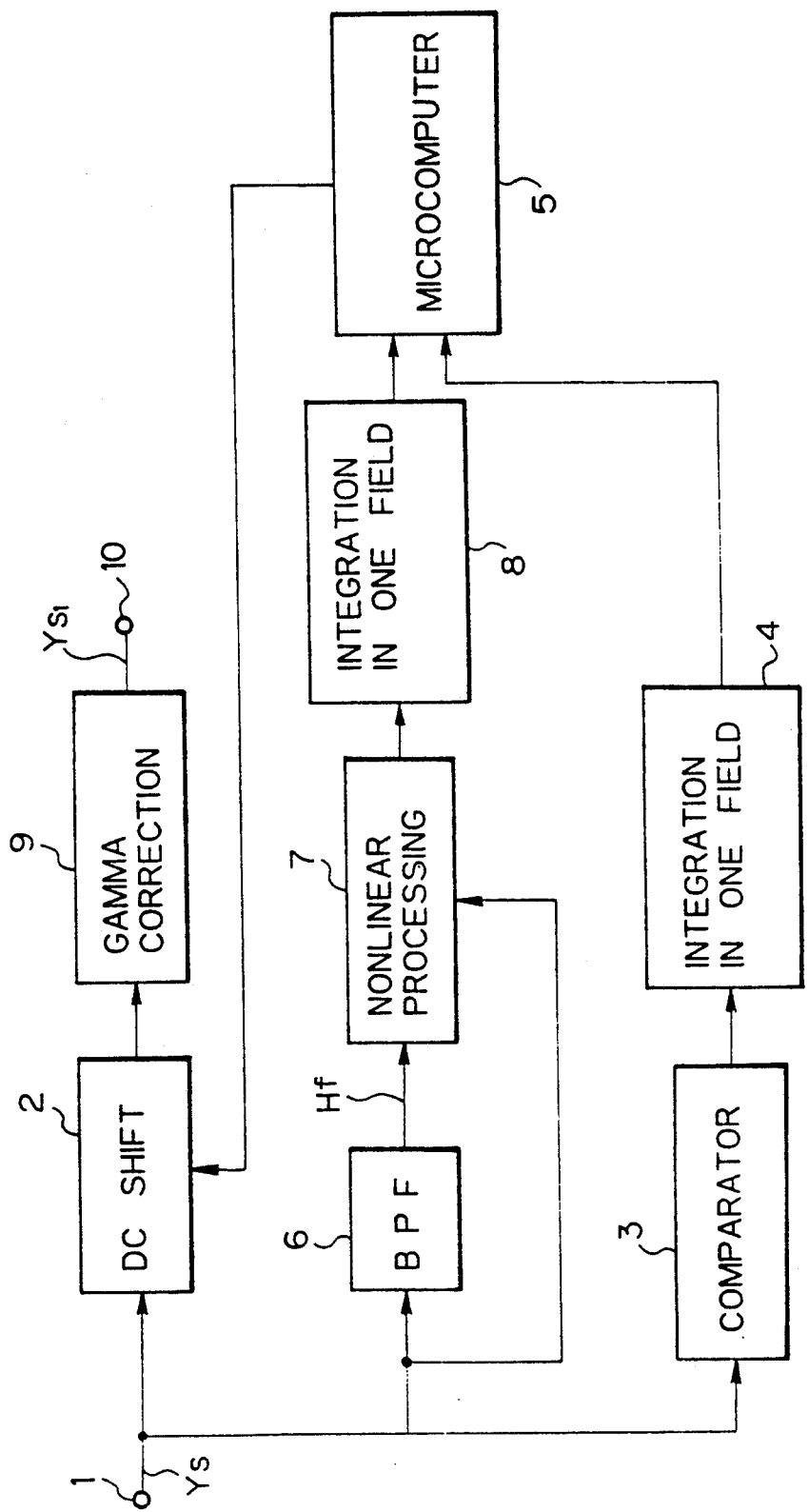

APPARATUS FOR SHIFTING THE DC LEVEL OF A LUMINANCE SIGNAL BASED ON FREQUENCY DISTRIBUTION AND RATE OF MODULATION

BACKGROUND OF THE INVENTION

1. Field of the Invention

This invention relates to a video signal processing circuit and, more particularly, to a video signal processing circuit for extending the dynamic range of a video signal.

2. Description of the Prior Art

Video signal processing circuits configured to shift the dc level of a luminance signal in order to increase the dynamic range are known. One of such video signal processing circuits is shown in FIG. 1 in which a luminance signal Ys enters through a video input terminal 51, and it is supplied to a dc shifting circuit 52 and a comparator 53. The input luminance signal Ys is compared with a predetermined reference level (hereafter referred to as ref) in the comparator 53. An output signal from the comparator 53 is integrated in a one-field integrating circuit 54 and then supplied to a microcomputer 55. The microcomputer 55 computes an amount of shifting the dc level corresponding to the signal supplied from the one-field integrating circuit 54, and supplies the result of the computation to the dc shifting circuit 52.

When the component of the luminance signal Ys is determined to be higher than the reference level ref in the comparator 53, the integral output from the one-field integrating circuit 54 is lowered. On the basis of this output, the dc level shifting amount to be supplied to the dc shifting circuit 52 from the microcomputer 55 is increased. When the component of the luminance signal Ys is determined to be higher than the reference level ref, the integral output from the one-field integrating circuit 54 is increased. On the basis of this output, the dc shifting amount to be supplied to the dc shifting circuit 52 from the microcomputer 55 is decreased. The luminance signal corrected in dc level by the dc shifting circuit 52 undergoes gamma correction by a gamma correcting circuit 56, and it is then output from a video output terminal 57. For the aforementioned circuit arrangement, a gamma correcting circuit which supplies a high gain when the level of the luminance signal Ys is low can be positively used.

FIGS. 2A, 2B, 3A and 3B show relations between the luminance signal Ys as an input signal to the above-mentioned video signal processing circuit and a luminance signal Ys1 as an output signal. In each of FIGS. 2A, 2B, 3A and 3B, the ordinate refers to the level of the luminance signal, and the abscissa to time.

As shown in FIG. 2A, by shifting the dc level of the luminance signal Ys having a high frequency only in a portion where the luminance level is high, the luminance signal Ys1 shown in FIG. 2B is obtained In FIG. 2B, the high frequency component in the luminance signal Ys1 is shifted in dc level, and undergoes gamma correction by the gamma correcting circuit 56. As a result, a signal having a high contrast is output from the video output terminal 57. At the same time, a dc component included in the luminance signal Ys is also dc-shifted together with the high frequency component. Therefore, the luminance signal is lowered to the black level shown by a broken line. As a result, the luminance level of the luminance signal in the dc component becomes the black level, and the signal is output as indicating "black" from the video output terminal 57. Therefore, when the signal is actually reproduced on a monitor, the entirety of the monitor becomes dark.

Further, as shown in FIG. 3A, by shifting the dc level of the luminance signal Ys having a high frequency only in a portion where the luminance level is low, the luminance signal Ys1 as shown in FIG. 3B is obtained. In FIG. 3B, the high frequency component in the luminance signal Ys1 is shifted in dc level, and undergoes gamma correction by the gamma correcting circuit 56. As a result, a signal of a high contrast is output from the video output terminal 57. Consequently, part of the high frequency component overlaps the black level shown by a broken line; however, when it is actually reproduced on a monitor, it does not matter from the visual viewpoint.

If such dc shifting is executed when the video signal shown in FIG. 2A is input, the signal having a low luminance level is lowered to the black level at the same time when the dynamic range of the high frequency component is extended. As a result, it is possible that the entirety of the monitor becomes dark. Therefore, the dc shifting amount for the luminance signal Ys is normally limited small. Although the modulated component in the luminance signal Ys1 shown in FIG. 3B should have a wider dynamic range, the dc shifting amount is maintained small in the prior art video signal processing circuit. Therefore, when the luminance signal shown in FIG. 3A is input, a sufficiently large dynamic range cannot be obtained.

OBJECTS AND SUMMARY OF THE INVENTION

It is therefore an object of the invention to provide a video signal processing circuit that selects luminance levels of a luminance signal Ys and responsively optimizes the dc shifting amount, thereby to provide a video signal with a maximum dynamic range.

According to an aspect of the invention, there is provided a video signal processing circuit comprising:
  level shifting means for shifting the dc level of an input luminance signal;
  gain adjusting means for increasing the gain for the luminance signal when the luminance signal has a low luminance level and for decreasing the gain for the luminance signal when the luminance signal has a high luminance level; and
  shifting amount setting means for setting the amount for shifting the dc level on the basis of the frequency distribution of the luminance signal and the rate of modulation of the luminance signal.

According to another aspect of the invention, there is provided a video signal processing circuit comprising:
  a dc level shifting circuit for shifting the dc level of an input luminance signal supplied;
  a filter circuit for passing a specific frequency band of the luminance signal;
  a level circuit for changing the level of an output signal from the filter circuit;
  a first integrating circuit for integrating an output signal from the level circuit;
  a comparator circuit for comparing the luminance signal with a reference signal;
  a second integrating circuit for integrating an output signal from the comparator circuit; and
  a control circuit to which output signals from the first and second integrating circuits, wherein the shifting amount of the dc level shifting circuit is controlled on the basis of an output signal from the control circuit.

The above, and other, objects, features and advantage of the present invention will become readily apparent from the following detailed description thereof which is to be read in connection with the accompanying drawings.

BRIEF DESCRIPTION OF THE DRAWINGS

FIGS. 2A and 2B are waveform diagrams of a luminance signal showing relations between an input signal and an output signal;

FIGS. 3A and 3B are waveform diagrams of a luminance signal showing relations between an input signal and an output signal;

FIG. 4 is a block diagram of a video signal processing circuit according to an embodiment of the invention;

DETAILED DESCRIPTION OF PREFERRED EMBODIMENTS

Figure 1:
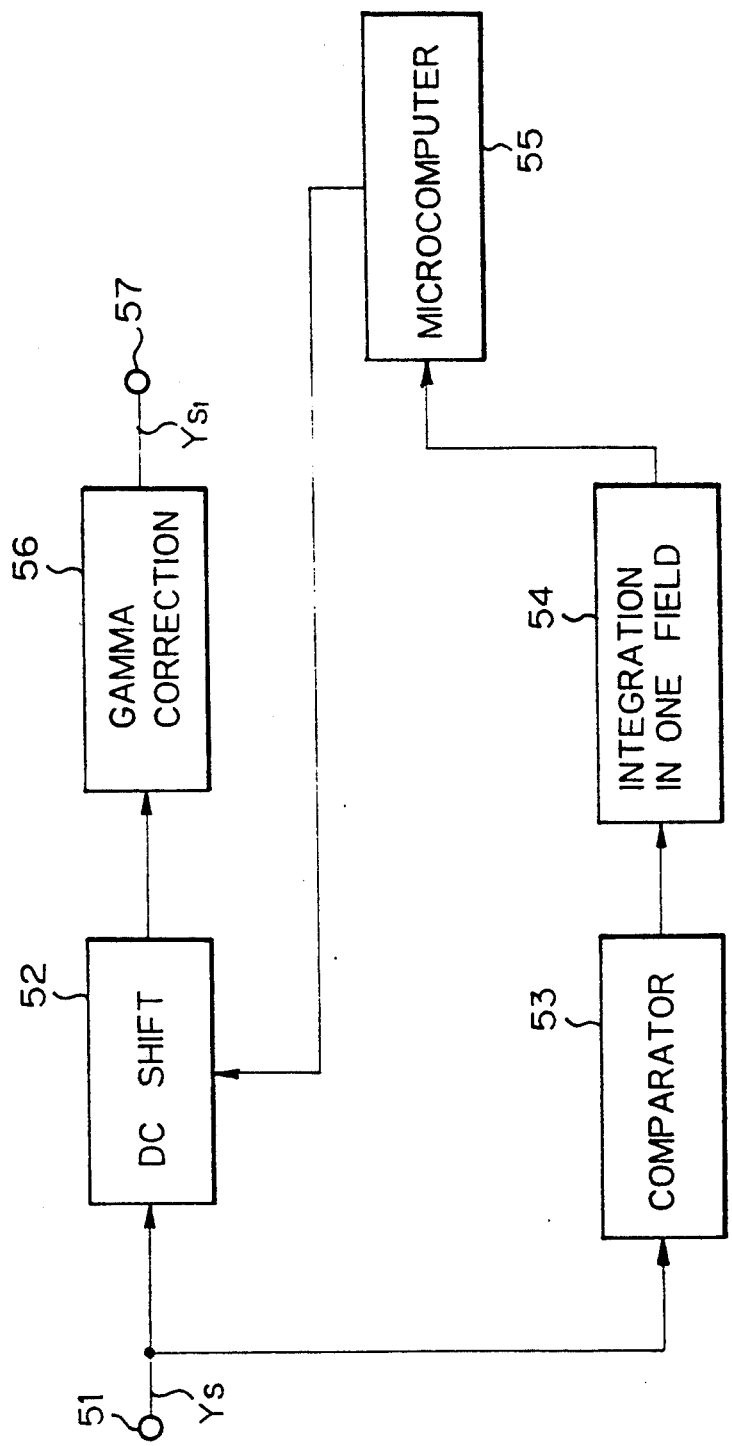
FIG. 1 is a block diagram of a prior art video signal processing circuit.

A video signal processing circuit taken as an embodiment to which the invention is applied is explained below with reference to the drawings.

FIG. 4 is a block diagram of the video signal processing circuit according to an embodiment of the invention. In FIG. 4, a luminance signal Ys is input through a video input terminal 1, and it is supplied to a dc shifting circuit 2, a comparator 3, and a band pass filter 6. The comparator 3 compares the input luminance signal Ys with a reference level ref which is slightly higher than the black level. If the luminance signal Ys is equal to or smaller than the reference level ref (Ys≧ref), the comparator 3 outputs "1". If the luminance signal Ys is larger than the reference level ref (Ys>ref), the comparator 3 outputs "0". That is, the output signal from the comparator 3 is represented by one of two digital values. In addition, by setting the reference level ref slightly higher than the black level, the area near the black level is calculated. If this value is equal to or higher than a predetermined value, dc shifting is not executed because, if the area near the black is excessively large, the entirety of the image becomes black and dark. This procedure makes it possible to select only video signals to which dc shifting is effective. An output signal from the comparator 3 is integrated by a one-field integrating circuit 4, and then supplied to the microcomputer 5 as information on the frequency distribution.

Figure 5:
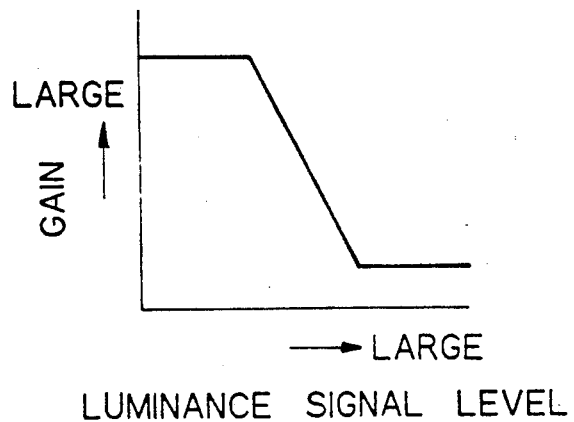
FIG. 5 is a circuit characteristic diagram of a nonlinear processing circuit.

Only components of a predetermined frequency band (high frequency component Hf) in the luminance signal Ys supplied to the band pass filter 6 is supplied to a nonlinear processing circuit 7. The nonlinear processing circuit 7 has a circuit characteristic as shown in FIG. 5. That is, as shown in FIG. 5, when the luminance signal level is low, the gain for the luminance signal Ys is set high; and when the luminance signal level is high, the gain for the luminance signal Ys is set low.

Figure 6A:
FIGS. 6A-6D are waveform diagrams of a luminance signal.
Figure 6B:
Figure 6C:
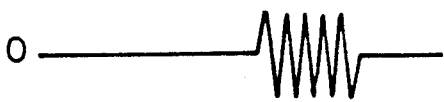
Figure 6D:

From the band pass filter 6 to the nonlinear processing circuit 7 is supplied the luminance signal Ys itself together with the high frequency component Hf in the luminance signal Ys. FIGS. 6A, 6B, 6C and 6D show these two signals. FIG. 6A shows a signal which is the high frequency component Hf supplied from the band pass filter 6 while FIG. 6B shows the luminance signal Ys supplied from the video input terminal 1. When these two signals are supplied to the nonlinear processing circuit 7, the rate of modulation of the high frequency component Hf is maintained small because the luminance level of the high frequency component Hf output from the band pass filter 6 is high. Further, FIG. 6C shows a signal which is the high frequency component Hf supplied from the band pass filter 6 while FIG. 6D shows the luminance signal Ys supplied from the video input terminal 1. When these two signals are supplied to the nonlinear processing circuit 7, the rate of modulation of the high frequency component Hf is made high because the luminance level of the high frequency component Hf output from the band pass filter 6 is low.

The output signal from the nonlinear processing circuit 7 is integrated in one field in the one-field integrating circuit 8. An output signal from the one-field integrating circuit 8 is supplied to the microcomputer 5 as the information on the rate of modulation. The microcomputer 5 increases the dc level shifting amount as the rate of modulation indicated by the information supplied becomes large, and decreases the dc level shifting amount as the frequency distribution supplied from the one-field integrating circuit 4 becomes small.

Figure 7:
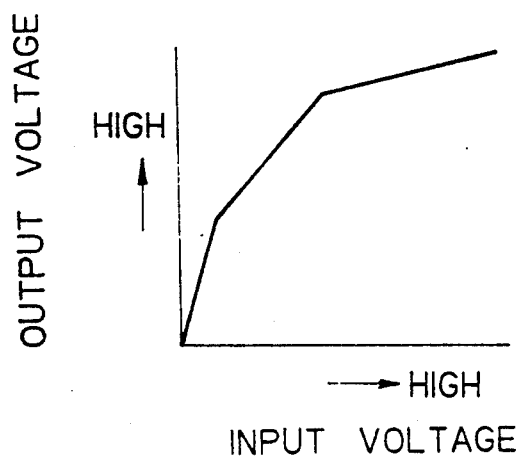
FIG. 7 is a circuit characteristic diagram of a gamma correcting circuit.

The output signal from the microcomputer 5 is supplied to the dc shifting circuit 2. The dc shifting circuit 2 uses the signal from the microcomputer 5 as a control signal to shift the dc level of the luminance signal Ys supplied from the video input terminal 1. The luminance signal Ys corrected in dc level by the dc shifting circuit 2 undergoes gamma correction in the gamma correcting circuit 9 having the circuit characteristic shown in FIG. 7, and it is then output from the video output terminal 10 as the luminance signal Ys$_1$.

In this fashion, by computing in the microcomputer 5 the dc level shifting amount by using two parameters, that is, information on the rate of modulation and information on the frequency distribution, and by setting the dc level shifting amount for the luminance signal Ys in response to the result of the computation, the input luminance signal Ys is adequately shifted in dc level.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

According to the invention, information on the frequency distribution near the black level is obtained from the luminance signal, information on the rate of modulation is obtained from the high frequency component in the luminance signal, and an amount for shifting the dc level is computed from the information on the frequency distribution and the information on the rate of modulation. Accordingly, the dynamic range can be increased by shifting the dc level by an adequate value in response to an input video signal. That is, only components of a video signal for which dc shifting is effective can be selected, and the dc shifting amount can be optimized.

What is claimed is:

1. A video signal processing circuit comprising:
- level shifting means responsive to a control signal for shifting the dc level of an input luminance signal having high and low luminance levels;
- gain adjusting means receiving the input luminance signal for increasing the gain for said luminance signal when said luminance signal has the low luminance level and for decreasing the gain for said luminance signal when said luminance signal has the high luminance level and producing a gain adjusted signal; and
- shifting amount setting means for producing said control signal fed to said level shifting means for setting the amount for shifting said dc level on the basis of a frequency distribution of said luminance signal and a rate of modulation of said luminance signal corresponding to said gain adjusted signal.

2. The video signal processing circuit according to claim 1 further comprising a frequency distribution circuit receiving the input luminance signal for obtaining said frequency distribution,
   wherein said frequency distribution circuit includes an integrating circuit to integrate said luminance signal and to control said shifting amount setting means on the basis of information indicating a result of the integration.

3. The video signal processing circuit according to claim 2 further comprising a band pass filter receiving the input luminance signal and producing an output signal to the gain adjusting means and a second integrating circuit for integrating an output of said gain adjusting means and wherein said frequency distribution circuit further includes a comparator receiving the input luminance signal and the integrating circuit integrates an output of said comparator, and wherein output signals of said integrating circuit and said second integrating circuit control said shifting amount setting means.

4. A video signal processing circuit comprising:
- a dc level shifting circuit for shifting the dc level of an input luminance signal supplied thereto;
- a filter circuit for passing a specific frequency band of said input luminance signal;
- a level circuit for changing the level of an output signal from said filter circuit;
- a first integrating circuit for integrating an output signal from said level circuit;
- a comparator circuit for comparing said input luminance signal with a reference signal;
- a second integrating circuit for integrating an output signal from said comparator circuit; and
- a control circuit connected to receive output signals from said first and second integrating circuits,
   wherein a shifting amount of said dc level shifting circuit is controlled on the basis of an output signal from said control circuit.

5. The video signal processing circuit according to claim 4 wherein said level circuit also receives said input luminance signal, whereby the level of said output signal from said filter circuit is changed in response to a signal level of said input luminance signal.

6. The video signal processing circuit according to claim 5 wherein each of said first and second integrating circuits integrates a respective signal fed thereto over every field.

* * * * *